US008892601B2

(12) United States Patent
Greenberg et al.

(10) Patent No.: US 8,892,601 B2
(45) Date of Patent: Nov. 18, 2014

(54) CREATING WEB APPLICATIONS USING CLOUD-BASED FRICTION-FREE DATABASES WITHOUT REQUIRING WEB HOSTING KNOWLEDGE

(75) Inventors: Steven Greenberg, Seattle, WA (US); Michael Hopkins Smith, Seattle, WA (US); Vijayalakshmi Ramkumar, Snoqualmie, WA (US); Brian Eugene Kihneman, Seattle, WA (US); Alexander Alexandrovich Spiridonov, Redmond, WA (US); David Michael Jade, Bellevue, WA (US); Shen Wang, Seattle, WA (US); Sumit Chauhan, Sammamish, WA (US); Gregory Chan, Seattle, WA (US); Tobias Joakim Bertil Ternström, Kirkland, WA (US); Russell Mark Sinclair, Seattle, WA (US); Todd Haugen, Clyde Hill, WA (US); Ritu Singh, Bellevue, WA (US); Daniel J. Cole, Sammamish, WA (US); Peter Alan Carlin, Seattle, WA (US); Christopher Todd Seitzinger, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 260 days.

(21) Appl. No.: 13/281,242

(22) Filed: Oct. 25, 2011

(65) Prior Publication Data

US 2013/0103639 A1    Apr. 25, 2013

(51) Int. Cl.
*G06F 7/00*       (2006.01)
*G06F 17/30*      (2006.01)
*G06F 21/31*      (2013.01)
*G06F 9/44*       (2006.01)
*H04L 29/08*      (2006.01)
*H04W 4/00*       (2009.01)

(52) U.S. Cl.
CPC ...... *G06F 9/44* (2013.01); *G06F 21/31* (2013.01); *G06F 17/3089* (2013.01); *H04L 67/02* (2013.01); *H04W 4/003* (2013.01)
USPC ........................................................ 707/785

(58) Field of Classification Search
USPC ........................................................ 707/785
See application file for complete search history.

(56) References Cited

U.S. PATENT DOCUMENTS 7,296,022 B2    11/2007    Harjanto ..................... 707/10
7,448,047 B2    11/2008    Poole et al. ................ 719/316

(Continued)

OTHER PUBLICATIONS

Mei Hui, Dawei Jiang, Guoliang Li, and Yuan Zhou, Supporting Database Applications as a Service, Mar. 29-Apr. 2, 2009, 12 pages. http://ieeexplore.ieee.org/stamp/stamp.jsp?tp=&arnumber=4812458.

(Continued)

*Primary Examiner* — Hosain Alam
*Assistant Examiner* — Van Oberly
(74) *Attorney, Agent, or Firm* — Rachael Vaughn; Jim Ross; Micky Minhas

(57) ABSTRACT

Creating web application using cloud-based friction-free databases without web hosting knowledge. User credentials are received at a web application service for initiating a web application task via client software. The user credentials are analyzed to determine whether to grant the user permission to initiate the requested web application task. The web application task is initiated when the permission is granted. Data associated with the initiated web application task is received at the web application service for analysis of the data to host and render a web application based solely on received data provided without basis of web hosting knowledge.

18 Claims, 17 Drawing Sheets

(56) References Cited

U.S. PATENT DOCUMENTS

| | | |
|---|---|---|
| 7,716,234 B2 | 5/2010 | Naibo et al. .................. 707/760 |
| 7,730,478 B2 | 6/2010 | Weissman ...................... 717/171 |
| 2003/0009445 A1 | 1/2003 | Muthukannan ................... 707/1 |
| 2003/0093436 A1 | 5/2003 | Brown et al. .................. 707/103 |
| 2006/0136351 A1 | 6/2006 | Angrish et al. ................... 707/1 |
| 2008/0082572 A1 | 4/2008 | Ballard et al. ................ 707/102 |
| 2009/0126000 A1* | 5/2009 | Andreev et al. ................... 726/8 |
| 2010/0274910 A1* | 10/2010 | Ghanaie-Sichanie et al. ............................. 709/229 |
| 2011/0016448 A1* | 1/2011 | Bauder et al. ................. 717/104 |
| 2012/0060107 A1* | 3/2012 | Papakonstantinou et al. ............................. 715/762 |

OTHER PUBLICATIONS

Soila Petet, Priya Narasimhan, John Wilkes, and Jay J. Wylie, Prato: Databases on Demand, Jun. 11-15, 2007, 2 pages. http://ieeexplore.ieee.org/stamp/stamp.jsp?tp=&arnumber=4273105.

* cited by examiner

1000

| | 1010 | 1020 | 1030 | 1040 | 1050 |
|---|---|---|---|---|---|
| | ID | ObjectID | AssetBinary | Path | ContentType |
| | 1 | 2546 | 0111111110000... | form1.htm | HTML |
| | 2 | 2789 | 0110101110000... | image1.jpg | Image |
| | 3 | 5647 | 0000011110011... | macro1.js | JavaScript |
| | 4 | 9512 | 0110011110110... | form2.htm | HTML |

Fig. 10

CREATING WEB APPLICATIONS USING CLOUD-BASED FRICTION-FREE DATABASES WITHOUT REQUIRING WEB HOSTING KNOWLEDGE

BACKGROUND

Hosted or locally installed business applications create, monitor, and otherwise process requests, orders, quotations, and comparable business operations. Many business applications also integrate other operational aspects, such as manufacturing, inventory, planning, and purchasing operations. Moreover, businesses sometimes require interaction between suppliers and consumers of goods and services.

The business experts who operate the business processes that these business applications automate are often the most knowledgeable about what the requirements of such business applications are. However, they often have little or no programming experience and the available programming tools to build these types of applications typically require database and programming expertise. This puts such tools beyond the reach of many of these business experts.

Since the 1970s, server-based relational databases allow organizations to store business data in a reliable, secure way and share that data widely. In contrast, desktop databases, such as Microsoft Access, which have been around since the 1990s, allow business experts to create relational databases. However, data in desktop databases is not as secure, reliable or shareable as data in server-based databases. Further, the options for building applications that are available today are inflexible, incomplete, too narrow in scope, or so complex that they are as difficult to understand as the programming options they are supposed to replace. For example, point solutions (pre-packaged applications) are limited because of either lack of support for customization or limited customization facilities. Templates for programming tools (pre-packaged solutions that can be modified in the tool) are an alternative solution that has had some success but those also suffer from a number of drawbacks. The underlying programming tool may still require a user to have database and programming expertise. Additionally, it is often challenging to find a template suited to solve a business problem. A suitable template may often be complex and difficult for the user to understand and modify. Furthermore, templates tend to be "islands" of functionality that are hard to combine.

Another common approach is to provide a wizard that prompts the user to make a series of choices that leads to the generation of an application based on those choices. However, typically, wizards are not re-entrant (i.e., they support generating not editing) and do not use an extensible metadata scheme that allows for update and extension. This limits the usefulness of such wizards.

Today, web applications are popular due to the ubiquity of web browsers, and the convenience of using web browsers as a client, sometimes called a thin client. One reason for the popularity of web applications is the ability to update and maintain web applications without distributing and installing software on potentially thousands of client computers. Another key reason for their popularity is the inherent support for cross-platform compatibility. Yet another benefit to the use of web applications derives from the use of databases for storing business information. Database software allows business information to be stored so that the information is easily accessible by all authorized business users. This increases team collaboration and improves team efficiency and communication. Thus, business customers want to be able to create web applications that are powered by databases.

However, today it is really hard to create web applications powered by databases. For example, Microsoft Access Server 2010 allows a designer to create a web database. Microsoft Access Server 2010 relies on SharePoint to provide web pages, URLs, and the basic infrastructure in order for a user to have a web application powered by a database. However, SharePoint does not provide a fully relational or transacted database storage, which limits the types of applications that can be created and the data integrity of those applications. SQL Server Express may be used to create relational databases. However, SQL Server Express does not provide a way to publish web pages or return a URL to allow a user to share the web page with someone else. Thus, SQL Server Express only supports the creation of a database, but does not support web application creation. Moreover, non-technical business users do not have the skills or knowledge to create a web database.

Thus, prior tools do not facilitate the creation of "real" relational databases and lack support for functionality, including support for transactions that are atomic, consistent, isolated and durable.

SUMMARY OF THE INVENTION

To overcome the limitations described above, and to overcome other limitations that will become apparent upon reading and understanding the present specification; embodiments for creating web applications using cloud-based friction-free databases without web hosting knowledge are disclosed.

The above-described problems are solved by combining functions of a database management system and a web-based collaboration platform. A designing surface is provided for creating a web application in a database management system. A middle tier and a Hosted Database Server control the web application so that the user does not require any knowledge regarding hosting of web applications.

An embodiment includes a method for creating web application using cloud-based friction-free databases. The method includes receiving user credentials at a web application service for initiating a web application task via client software, analyzing the user credentials to determine whether to grant permission to initiate the requested web application task, initiating the web application task when permission and receiving data associated with the initiated web application task at the web application service for analysis of the data to host and render a web application based solely on received data provided without basis of web hosting knowledge.

Another embodiment includes a system for creating web application using cloud-based friction-free databases. The system includes a client for providing user credentials for initiating a web application task, a middle tier for mapping a web application associated with the web application task, identifying a login for the mapped web application and determining a role associated with a user based on the provided user credentials and a Hosted Database Server for maintaining a system database and an application database, the system database being used to map users, credentials and application databases, wherein the user credentials are analyzed to determine whether to grant permission to initiate the requested web application task, the web application task being initiated when permission is granted and receiving data associated with the initiated web application task at the middle tier for analysis of the data to host and render a web application based solely on received data provided without basis of web hosting knowledge.

Another embodiment provides a computer-readable memory device with instructions stored thereon for creating web application using cloud-based friction-free databases. The instructions include receiving user credentials at a web application service for initiating a web application task via client software, analyzing the user credentials to determine whether to grant permission to initiate the requested web application task, initiating the web application task when permission is granted and receiving data associated with the initiated web application task at the web application for analysis of the data to host and render a web application based solely on received data provided without basis of web hosting knowledge.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

Referring now to the drawings in which like reference numbers represent corresponding parts throughout:

FIG. 10 illustrates a resource table in the application database according to an embodiment;

DETAILED DESCRIPTION

Embodiments are directed to creating web applications using cloud-based friction-free databases without web hosting knowledge.

Figure 1:
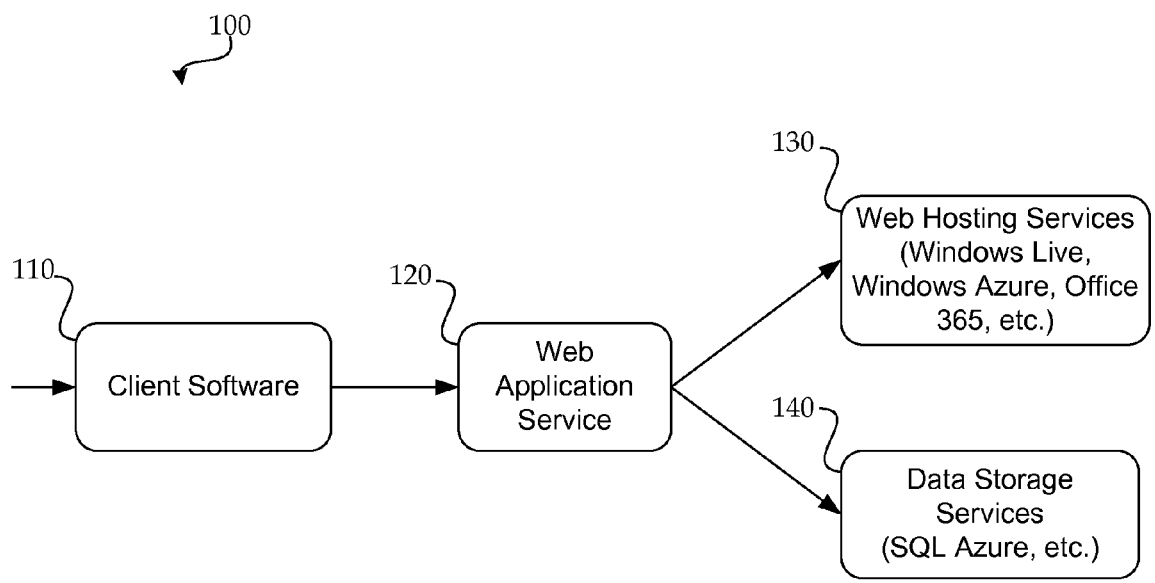
FIG. 1 provides a high level architecture of a system for creating web application using cloud-based friction-free databases according to one embodiment.

FIG. 1 provides a high level architecture of a system for creating web application using cloud-based friction-free databases 100 according to one embodiment. In FIG. 1, a user builds a web application using client software 110, such as a web browser, Access client software, etc. The user may create page user interfaces, database schema, other database properties, etc. The client software provides an option that allows a user to select to host an application on the Internet. The user provides a name for the application and selects the option to host an application on the Internet. The application will then be available for use on the Internet. This eliminates the barrier requiring the user to understand the process for obtaining a domain for hosting the application, as well as actually securing a domain and performing all the steps to have the web application hosted. Once the user selects the option to host an application on the Internet, a web application service 120, such as Microsoft Access Services, contacts Web Hosting services 130 and Data Storage services 140 on behalf of the user.

Figure 2:
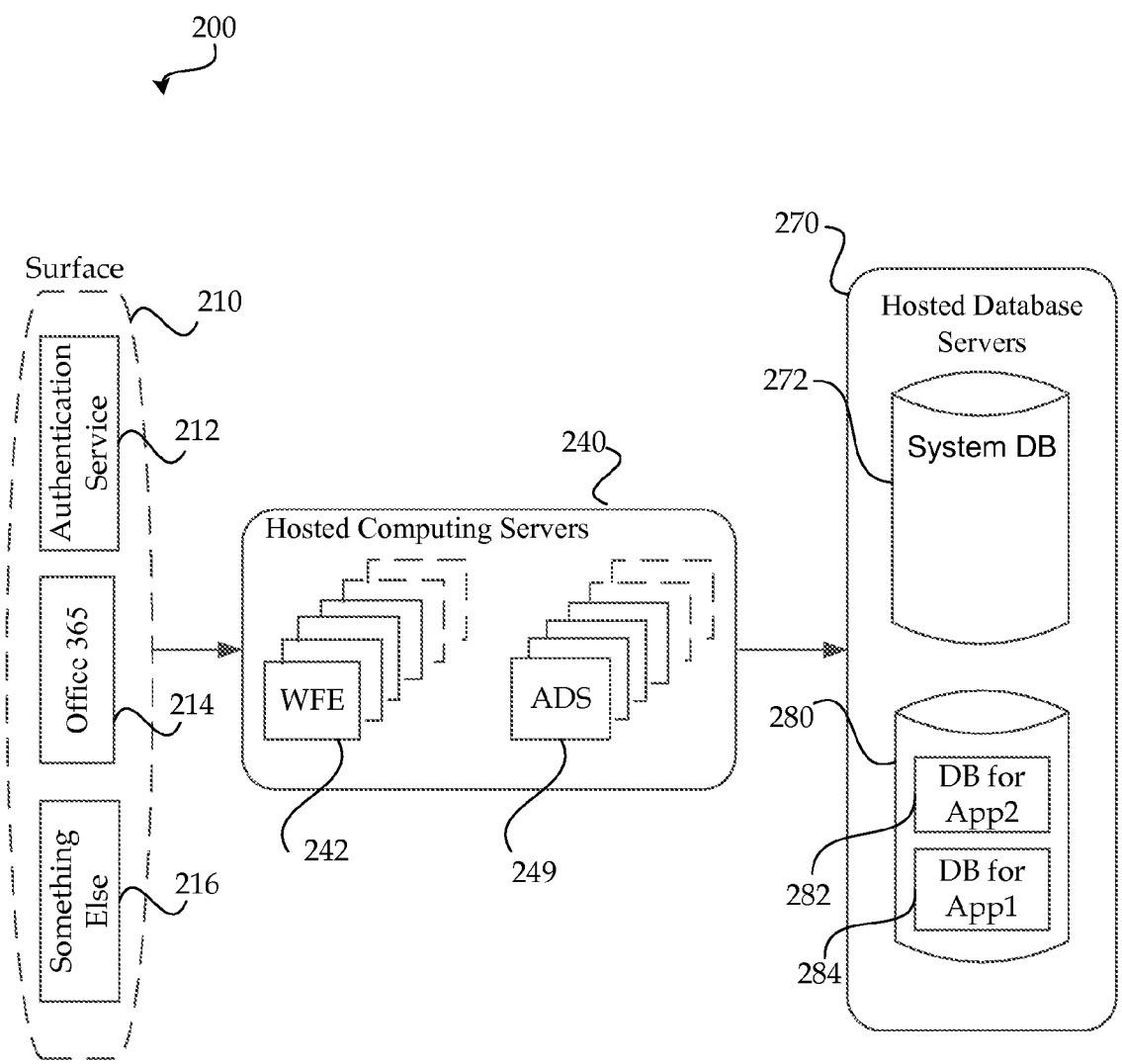
FIG. 2 illustrates a block diagram representing a 3-tier topology according to an embodiment.

FIG. 2 illustrates a block diagram representing a 3-tier topology 200 according to an embodiment. Databases are hosted in custom databases on Hosted Database Servers 270, such as SQL Azure™. These databases are customized, e.g., above and beyond the default Hosted Database Server offering, to be able to be provisioned cost effectively. Customization includes limiting the amount of data in the database and the set of available logons.

In FIG. 2, the 3-tier topology 200 includes a surface 210, the host in Hosted Computing Servers 240, such as Windows Azure™, and the host in Hosted Database Server 270. When a user purchases software, the software will have a surface 210 where the user may design a web application and a relational database that is powering the web application that provides data for the web application. FIG. 2 shows the surface 210 may include an authentication service 212, such as Windows Live™, a business productivity suite 214 for providing messaging and collaboration tools and other software 216, such as Office 365. From the user interface, the user is presented an option for hosting the web application. The user does not need to know where they located, e.g., which server they are communicating with, to provision the application on the Internet. A URL is returned for the user that directs the user to their application on the Internet. Millions of database applications may co-exist in the Hosted Database Server hosting environment. Application developers and users may come from different surfaces, wherein each has their own method for authentication.

A database management system may run on a Hosted Computing and Database Server platform 240/270. To run Access Services as a hosted service, a platform for file storage (HTML and JS) is needed, as well as a SQL database to store user data, and a platform to process Access Services, e.g., web front end (WFE) servers 242 and automated deployment services (ADS) servers 244. Thus, underneath the surface 210, machines are running in Hosted Computing Servers 240 and Hosted Database Server 270 for rendering the web application for the user without requiring any knowledge of the underlying technology. Moreover, databases can be used with other platforms, such as Office 365, Windows Live™, FaceBook or any other site of the user's choice. Because the assets are "real" SQL Server assets—tables, views, stored procedures, the assets may be edited using a professional tool, such as Visual Studio or SQL Server Management Studio. In addition, Access Services may support thousands of users sharing the same instance. User data, e.g., pages and database, and permission settings are stored in a secure manner so users cannot see each other's data.

Each database application includes a URL and an application database. Access Services stich together each database application by managing the system database 272 to map users, credentials and application databases. Access Services run in Hosted Computing Servers 240 with one subscription. Developers and application users are identified by their user credential, e.g., Windows Live™ identification (WLID). One database per application is created in Hosted Database Servers 270. In addition, one database specific login and three database roles/users are created for each application database. A user's credential is mapped to the users for each application database 280 to determine whether the user has rights to read, write or design. All relational data is stored in the application database 280. In FIG. 2, a database for a first application 282 and a second application 284 are shown. All non-relational data is also stored in the application database 280. HTML, JS and any other non-relational data are stored in the "asset table" in the application database. Hosted Database Servers 270 is used to dynamically manage a set of servers so costs are minimized. However, capacity of the systems may be expanded dynamically.

Figure 3:
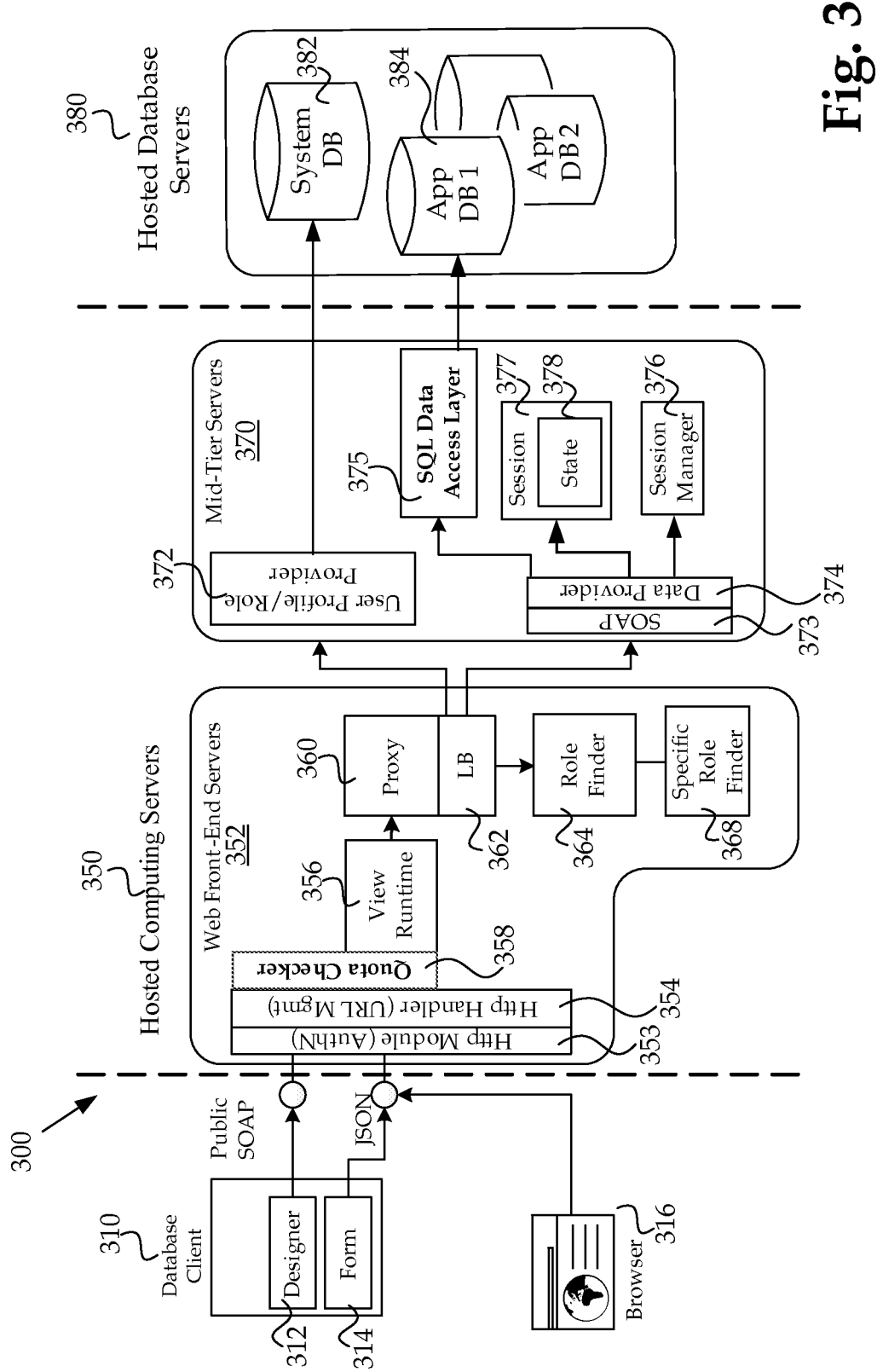
FIG. 3 is a detailed block diagram of a 3-tier topology according to an embodiment.

FIG. 3 is a detailed block diagram of a 3-tier topology 300 according to an embodiment. In FIG. 3, a user creates a web application using client software 310. The hosting and control for the web application may be provided by Hosted Computing Servers 350, such as Windows Azure™, and Hosted Database Servers 380, such as SQL Azure™, as described above. A user creates the web application using client software 310, which provides a designer module 312 and a form module 314. Using a database management system 310, the user may send the web application to the Hosted Computing Servers 350 using a browser 316. The Hosted Computing Servers 350 includes a Web Front-end server 352 and a Mid-tier server 370. The Web Front-end server 352 includes a HTTP module 353 for receiving the data and pages associated with the web application and authentication codes from the user. A HTTP handler 354 is provided for managing URLs. A quota checker 355 verifies that the user does not exceed parameters associated with a subscription, e.g., one database per application, one database specific login and three database roles/users.

View runtime 356 provides information concerning the Web application. Proxy 360 loads and invokes routines that are handled by the Mid-tier server 370. Load balancer (LB) 362 manages connections by determining which gateway processes a connection request. Role finder 364 for discovering specific machines for handling the specific middle tier machines need to handle that request. Specific role finder 368 is associated with a specific machine.

The mid-tier server 370 includes a user profile/role provider module 372. The user profile/role provider module 372 communicates with the system database from the Hosted Database Server to obtain information associated with the user. SOAP interface 373 is an example of an interface for providing interoperability, while data provider 374 provides data to the SQL data access layer 375, session manager 376 and session 377. SQL data access layer 375 accesses the application databases 384 in the Hosted Database Server 380. Session Manager 376 may be called to create a new session or, if the user has registered previously, return an existing session. The Session 377 and an associated state 378 are maintained by the Mid-tier server 370. The Hosted Database Server 380 includes the system database 382 and the application databases 384.

Figure 4:
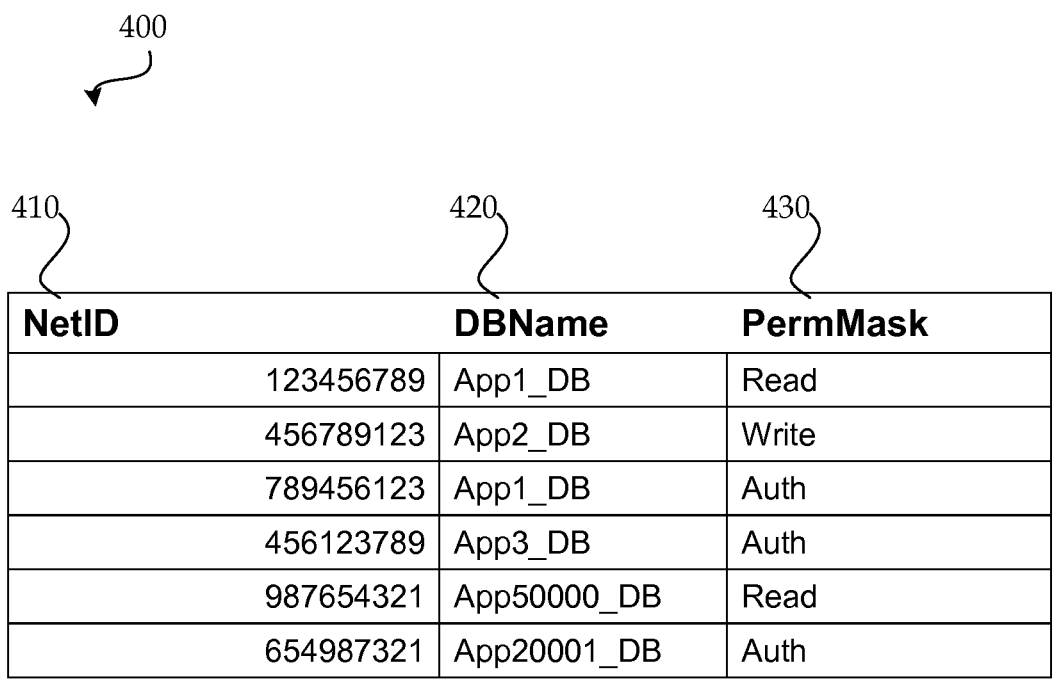
FIG. 4 illustrates a user credential to database roles mapping table according to an embodiment.

FIG. 4 illustrates a user credential to database roles mapping table 400 according to an embodiment. Since WFE authenticates users based on authentication of user credentials (e.g., Windows Live™ ID) and DB specific roles are relied on for each DB to protect the user data, a table 400 is used to map a UserToken or other user credential to DB roles. This table 400 is saved in the System database. In FIG. 4, user credentials 410 are mapped to DBNames 420. The rights 430 associated with each NetID 410/DBName 420 mappings are also maintained in the table 400.

Figure 5:
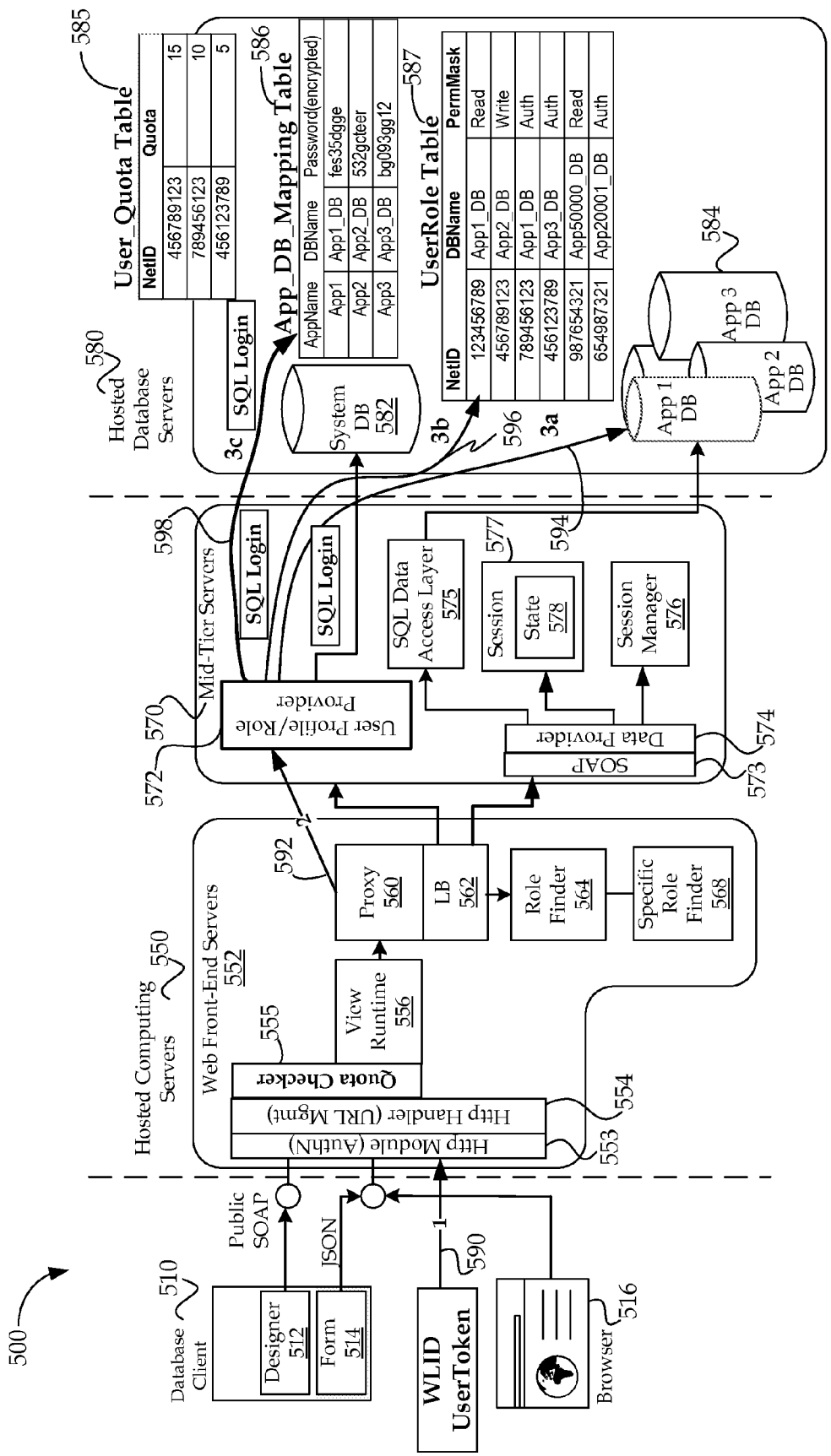
FIG. 5 illustrates the process of creating a web application according to one embodiment.

FIG. 5 illustrates the process of creating a web application 500 according to one embodiment. In FIG. 5, a user creates a web application using client software 510. The hosting and control for the web application may be provided by Hosted Computing Servers 550, such as Windows Azure™ and Hosted Database Servers 580, such as SQL Azure™, as described above.

FIG. 5 includes elements described in detail with reference to FIG. 3 above, including client software 510 having a designer module 512 and a form module 514, Web Front-end server 552 that includes a HTTP module 553, a HTTP handler 554, a quota checker 555, view runtime 556, proxy 560, load balancer (LB) 562, role finder 564, and Specific role finder 568, Mid-tier server 570 that includes a user profile/role provider module 572, user profile/role provider module 572, SOAP interface 573, data provider 574, SQL data access layer 575, session manager 576 and session 577, and SQL data access layer 575 that includes the system database 582 and the application databases 584. FIG. 5 also shows the user quota table 585, the application database mapping table 586 and the user role table 587.

In creating a web application, the user first provides a request along with a user credential 590. The WFE passes the UserToken to the middle tier provided by the Web Front-end server 550 and Web worker 570. The middle tier provisions an App DB 594. Three roles and three users are created. The login for the System DB may be used to add a new row in the App_DB_Mapping table to represent this new application 598. The login for System DB may be used to add a new row in the UserRole Table for this user (author) 596.

Figure 6:
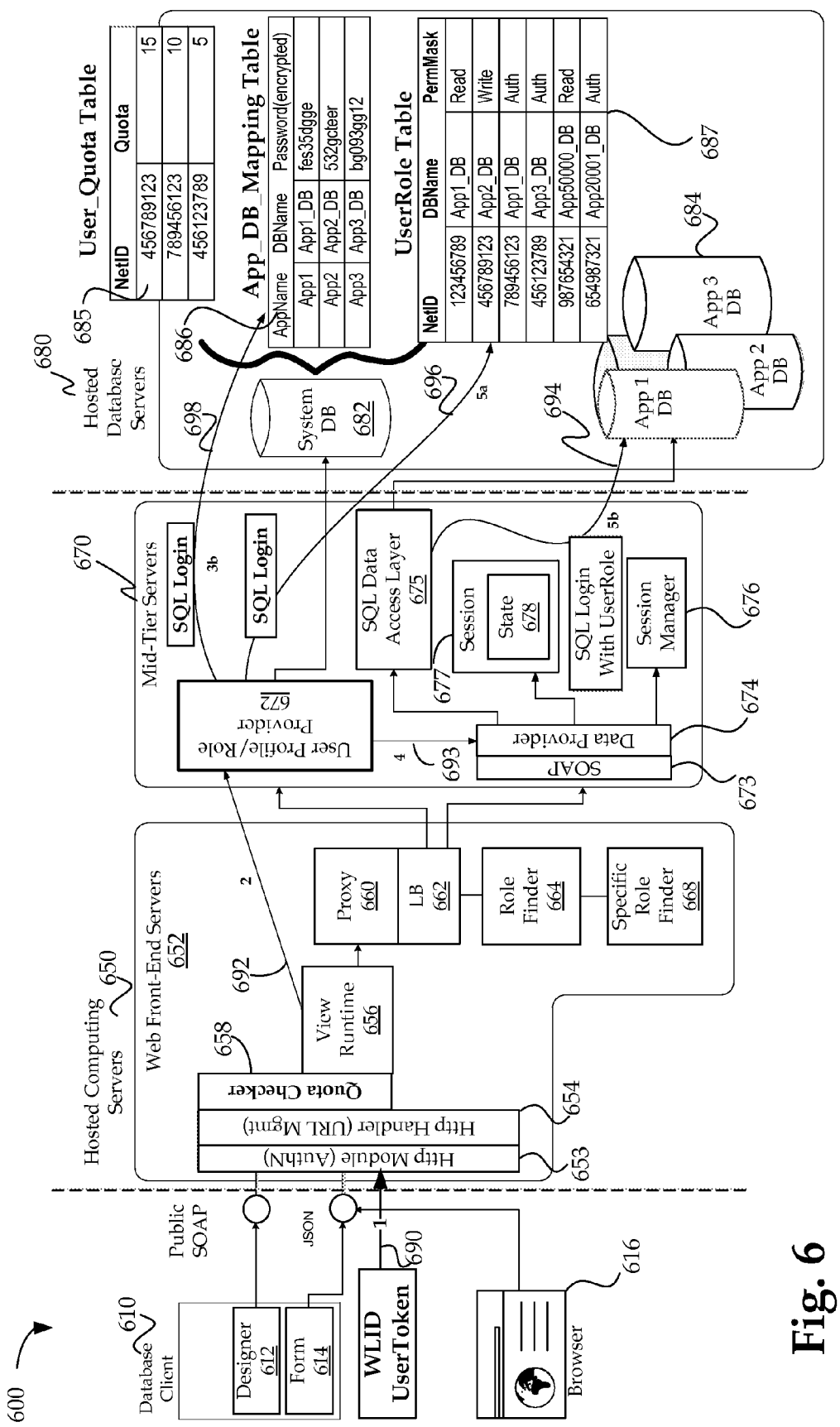
FIG. 6 illustrates the process of browsing to an application that has already been published according to one embodiment.

FIG. 6 illustrates the process of browsing to an application that has already been published 600 according to one embodiment. Again, FIG. 6 includes similar elements described above with reference to FIGS. 3 and 5. In FIG. 6, a user requests a page 690. If the request carries the user credential, the process continues. Else, the user is bounced off of the authentication server to get the token. The WFE passes the user credential to the middle tier provided by the Web Front-end server 650 and Web worker 670. The middle tier uses the SQL login for System DB to determine which application DB 684 the requested application maps to, and identifies the login for that application 698. The middle tier also determines the role this user has 696, e.g., on this application and other applications. If the user role has permission to browse to this application, the middle tier passes the User Profile, e.g., user credential, what role to which application, and possibly other things such as FN/LN, which may be fetched and stored in the UserRole Table 687, to Data Provider 674. The SQL data access layer 675 uses the application login to impersonate the user to get the application data 694 from the application database 684. In the case of modifying an application, the steps are the same except that the request is only initiated from the client 610.

Figure 7:
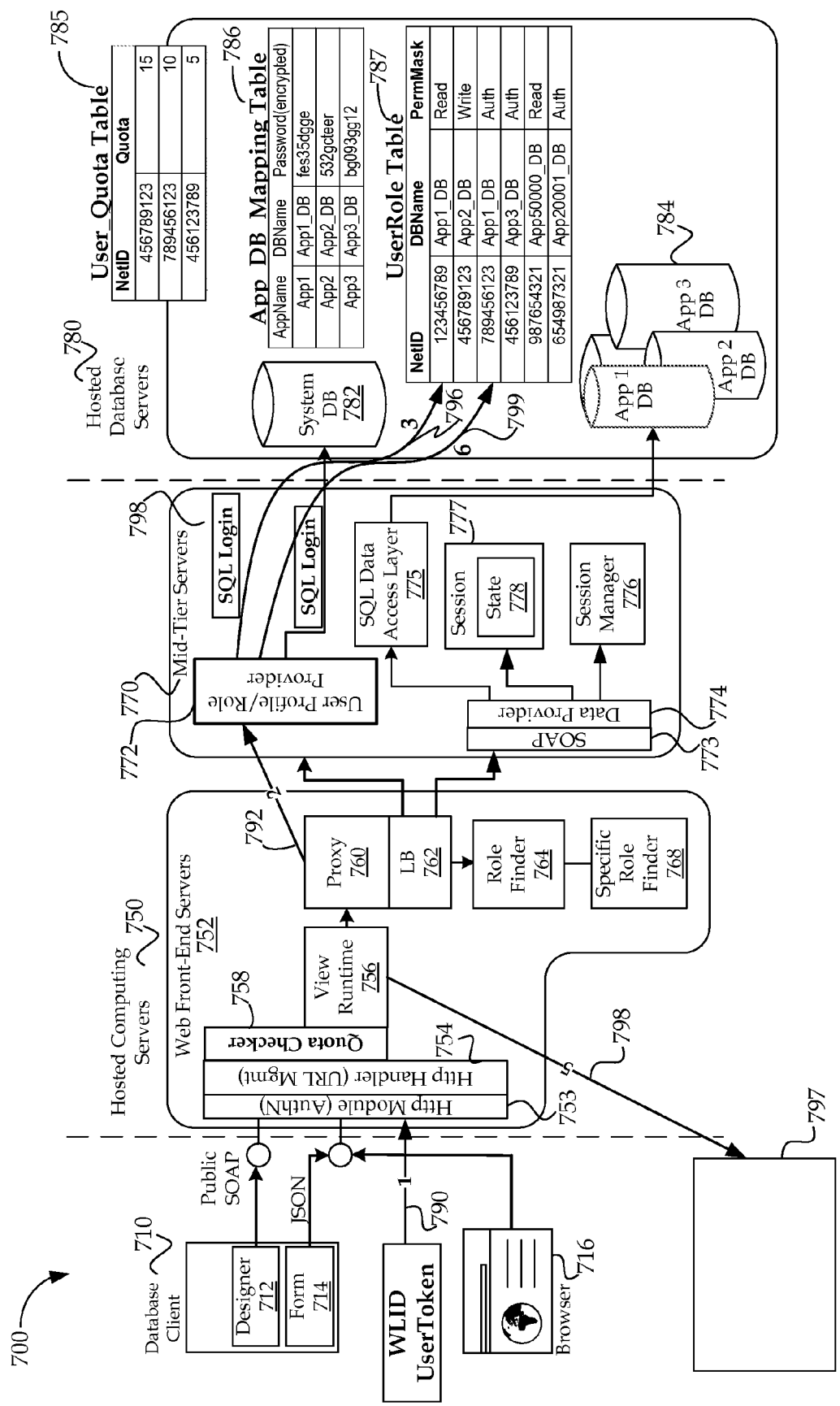
FIG. 7 illustrates the process of granting permissions according to an embodiment.

FIG. 7 illustrates the process of granting permissions 700 according to an embodiment. Again, the elements shown in FIG. 7 are similar to the elements described in detail with reference to FIGS. 3, 5 and 6 above.

In FIG. 7, a user requests to grant permission for access to the user's application to another user 790. The WFE passes the UserToken to the middle tier provided by the Web Front-end server 750 and Web worker 770. The middle tier also determines the role this user has 796, e.g., does the user have an author role or not for this application. If yes, WFE redirects the user to the Permission Management page hosted on WFE 797, 798. The login 799 is used for the System DB 782 to add a new row in UserRole Table 787 to represent the new members of this application.

Figure 8:
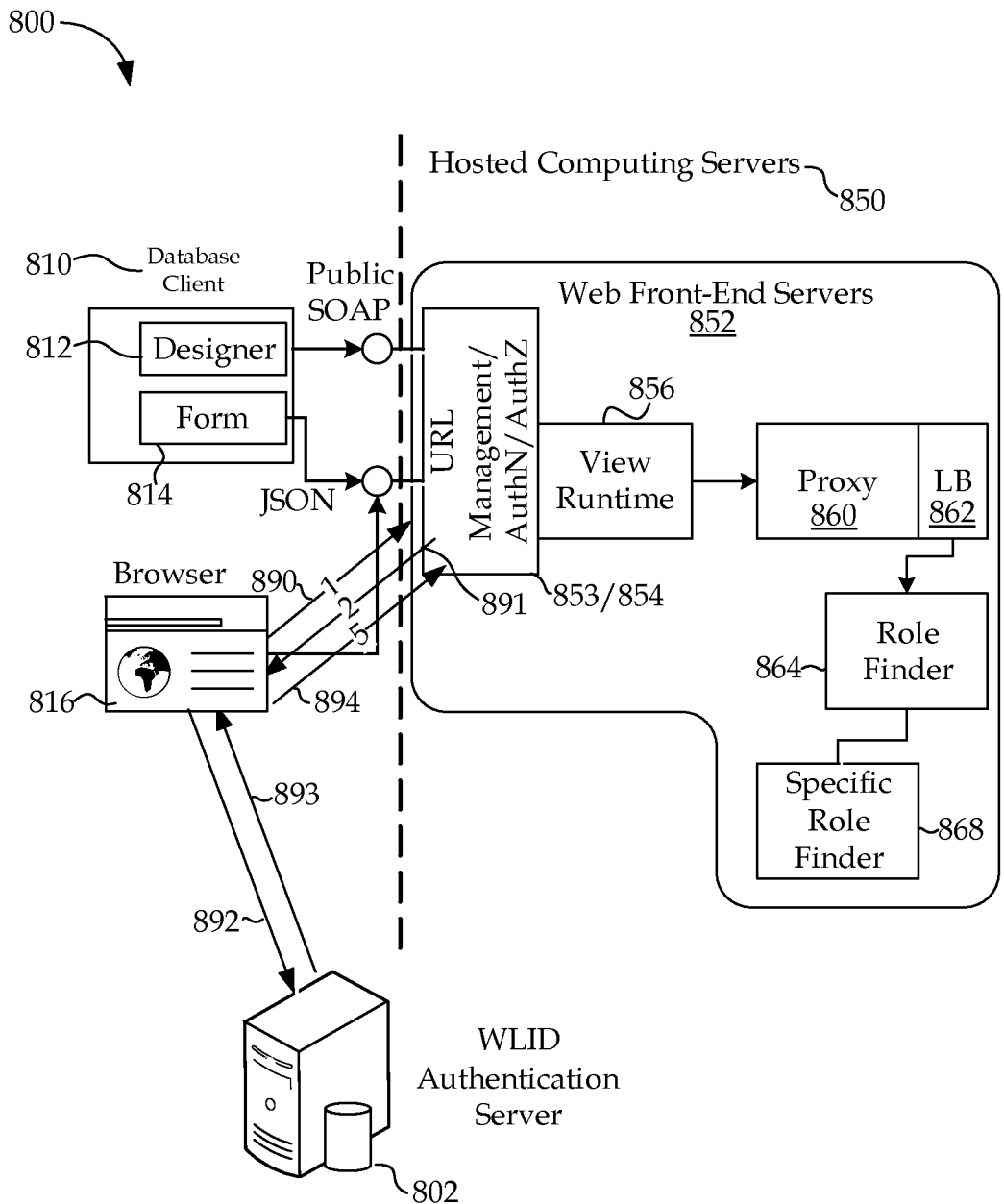
FIG. 8 illustrates the process for authenticating the user that browses to the application according to an embodiment.

FIG. 8 illustrates the process for authenticating the user that browses to the application 800 according to an embodiment. Some elements are similar to elements shown in FIGS. 3, 5, 6 and 7 above. In FIG. 8, a user makes a request to see the application at the URL 890. The Web Front-end server 852 returns the sign-in page 891. The user signs in with a user credential or sign up 892. The user credential authentication server 802 authenticates the user 893. The authentication server redirects the user back to WFE 894. Alternatively, federated identity may be used with integration to Audit Collection Services (ACS) from the application fabric of the hosted servers. This enables not only authentication of user credentials, but also FaceBook and everything else ACS is able to communicate with.

Figure 9:
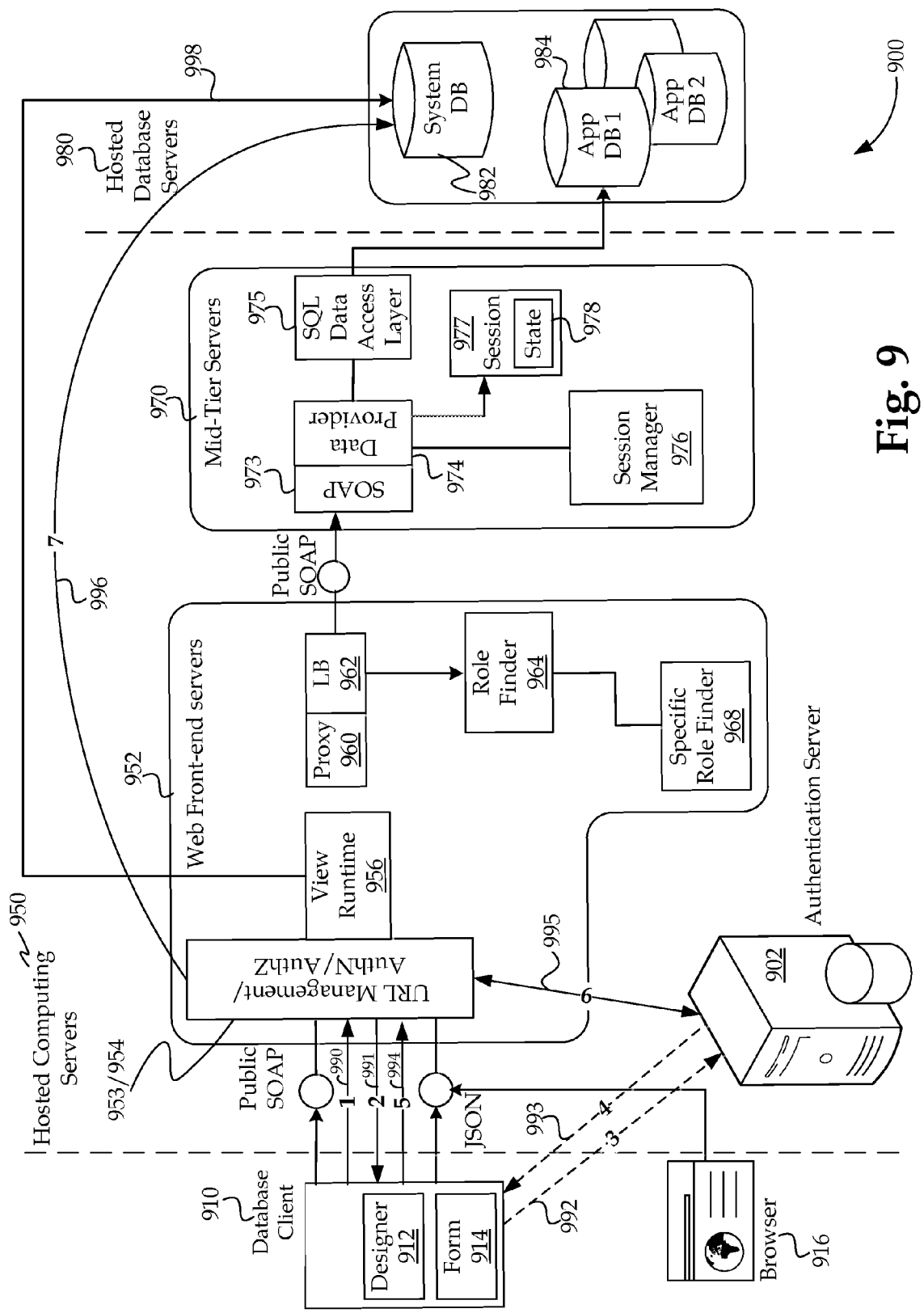
FIG. 9 illustrates the process for granting permissions according to an embodiment.

FIG. 9 illustrates the process for granting permissions 900 according to an embodiment. Some elements are similar to elements shown in FIGS. 3, 5, 6, 7 and 8 above. To grant permissions for each user credential, a user requests to see the application at the specified URL 990. The sign-in page is returned 991. The user signs in with user credential or sign up 992. The user credential authentication server 902 authenticates the user 993. The user credential authentication server redirects the user back to WFE 994. The NetID for each Email the user typed in for permission is obtained 995. Each NetID is added to the SystemDB 996. Other data may be provided directly to the SystemDB 998.

FIG. 10 illustrates a resource table 1000 in the application database according to an embodiment. Non-relational data for the application is stored in the application database. The resource table 1000 includes an ID field 1010, an object ID field 1020, an asset binary field 1030, a path field 1040 and a content type field 1050. The path field 1040 is designed to save the relative path for each asset. For example, if the application URL is https://access.cloudapp.net/123456789012, and the URL for form1 is https://access-.cloudapp.net/123456789012/form1.htm, then the path for the form saved in the table will be the "form1.htm" portion.

Figure 11:
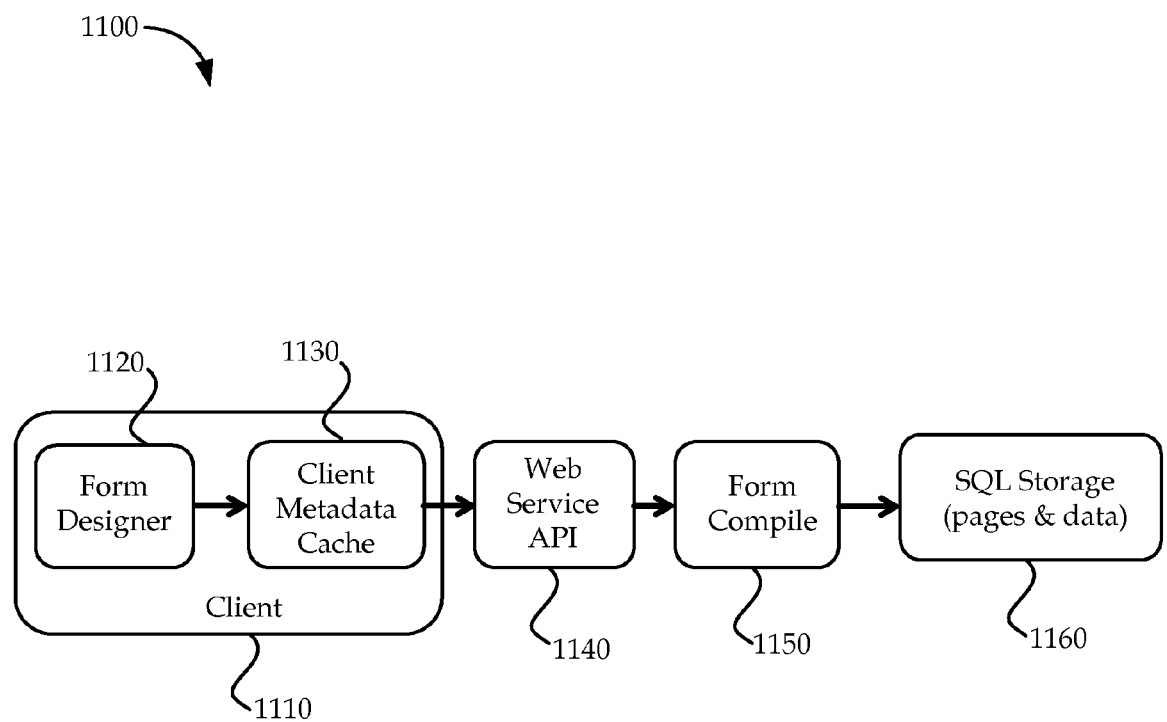
FIG. 11 illustrates a flow that assets go through to be saved in the application database according to an embodiment.

FIG. 11 illustrates a flow 1100 that assets go through to be saved in the application database according to an embodiment. A client 1110 includes a form designer 1120 and content metadata cache 1130. Data is passed to a Web Service API 1140. Next, a form is compiled 1150. Then, the asset is saved in SQL storage 1160.

Figure 12:
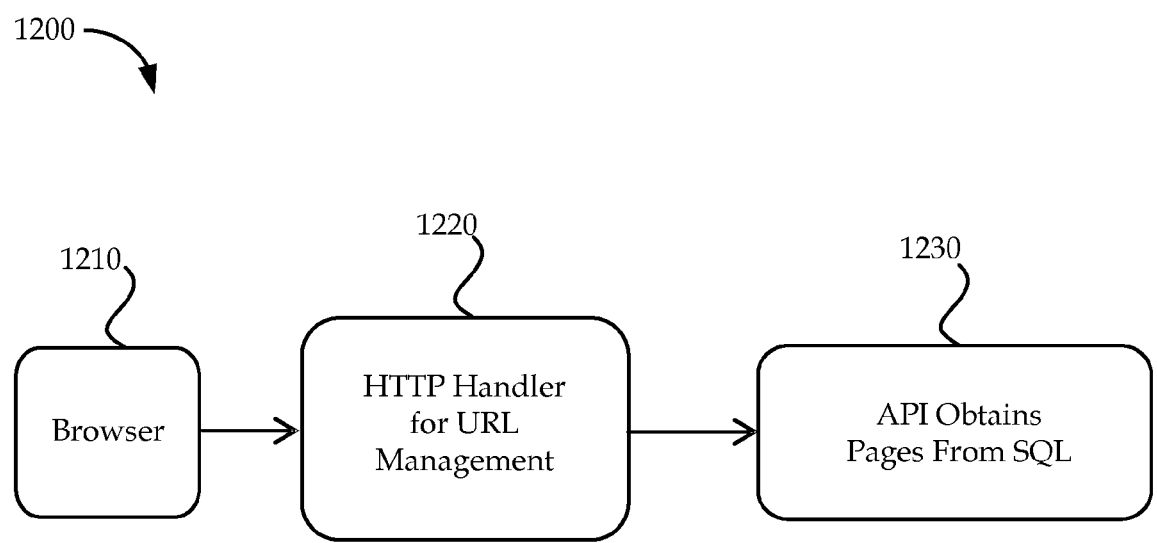
FIG. 12 illustrates a flow for a page request from a browser according to an embodiment.

FIG. 12 illustrates a flow 1200 for a page request from a browser according to an embodiment. In FIG. 12, a request is made using a browser 1210. The request is managed by an HTTP handler 1220. Then, an API obtains pages from the SQL server 1230.

Figure 13:
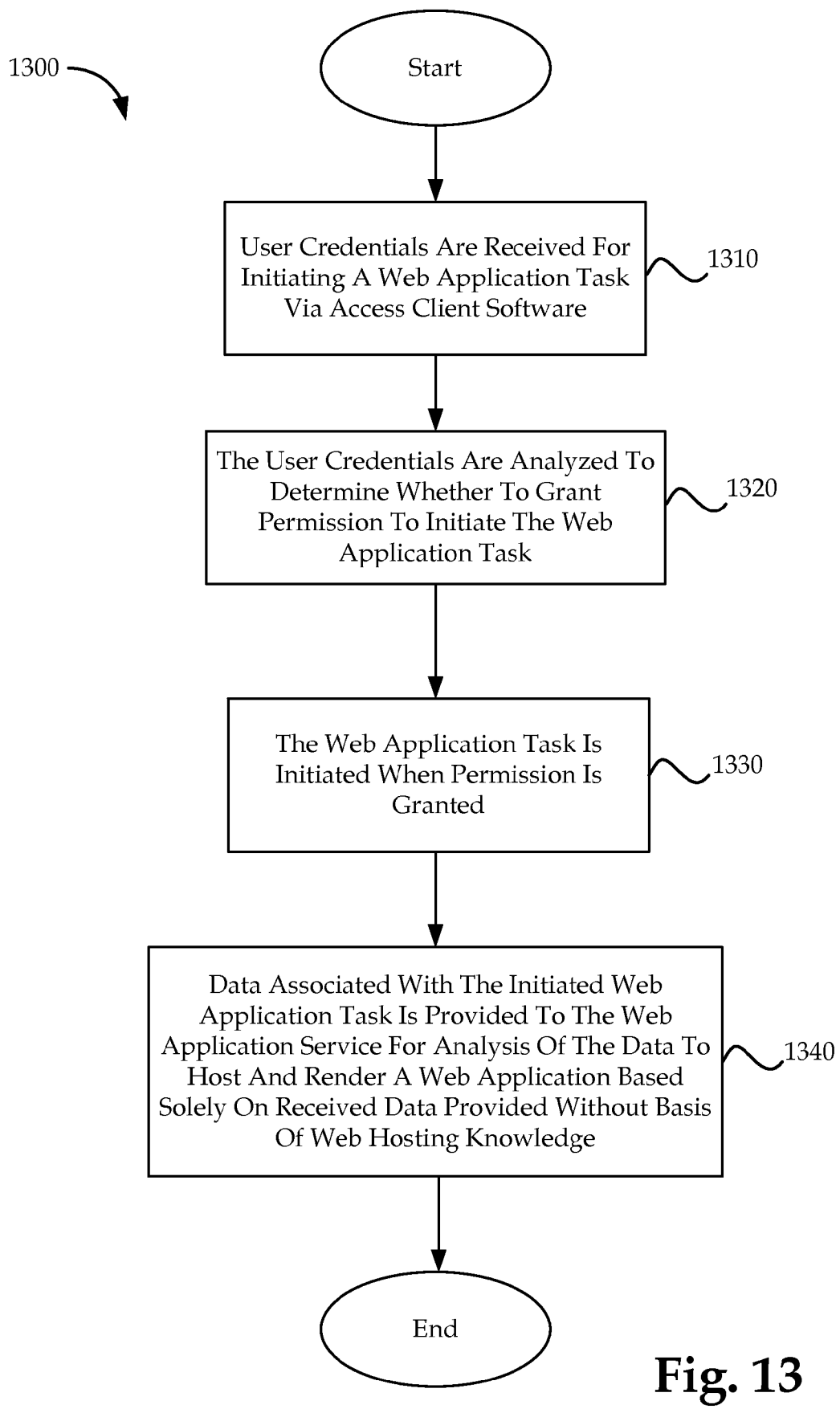
FIG. 13 is a flow chart of a method for creating web application using cloud-based friction-free databases according to an embodiment.

FIG. 13 is a flow chart 1300 of a method for creating web application using cloud-based friction-free databases according to an embodiment. In FIG. 13, user credentials are received at a web application service for initiating a web application task via client software 1310. The user credentials are analyzed to determine whether to grant permission to initiate the web application task 1320. The web application task is initiated when permission is granted 1330. Data associated with the initiated web application task is provided to the web application service for analysis of the data to host and render a web application based solely on received data provided without basis of web hosting knowledge 1340.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 14-17 and the associated descriptions provide a discussion of a variety of operating environments in which embodiments may be practiced. However, the devices and systems illustrated and discussed with respect to FIGS. 14-17 are for purposes of example and illustration and are not limiting of a vast number of computing device configurations that may be utilized for practicing embodiments, described herein.

Figure 14:
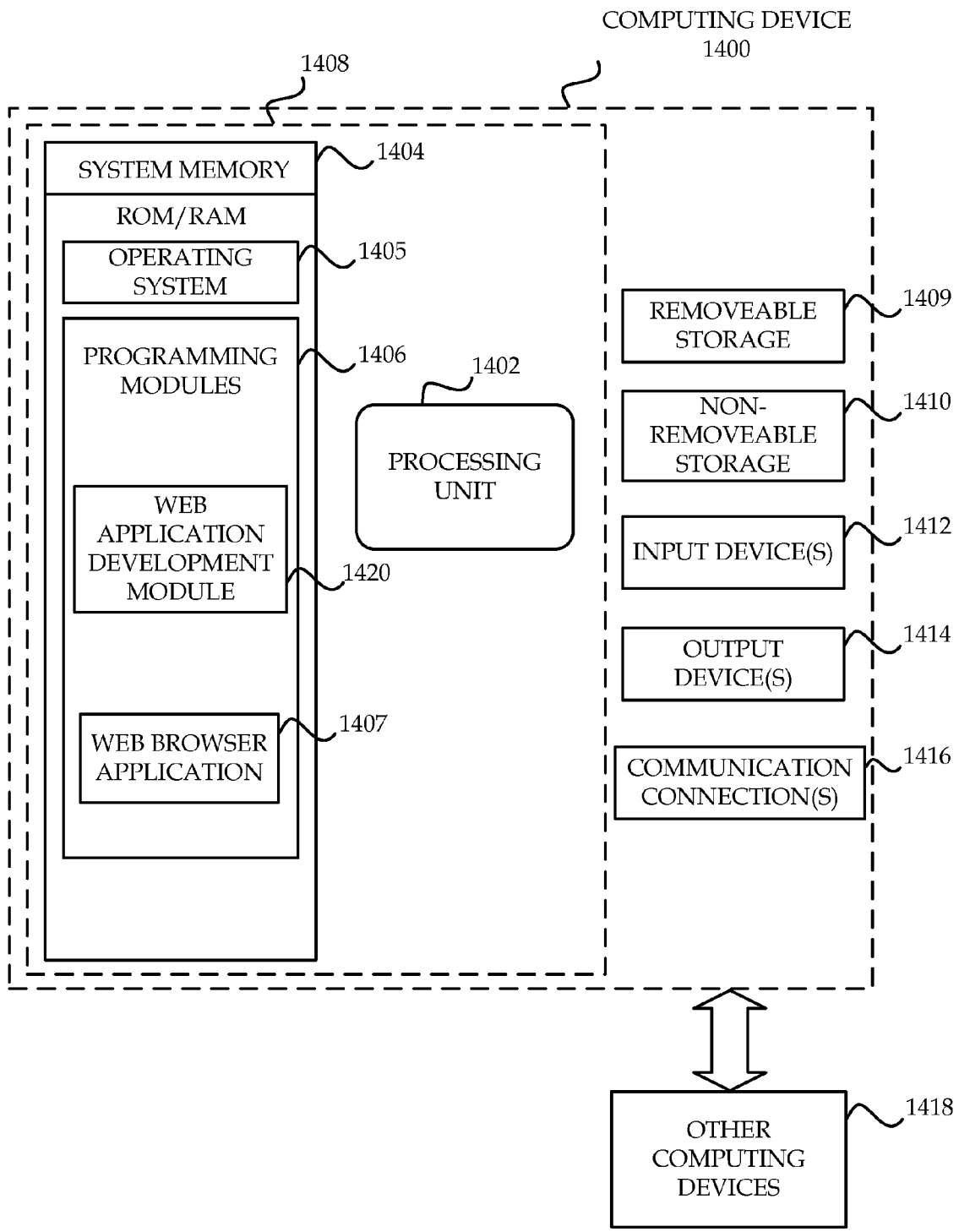
FIG. 14 is a simplified block diagram of a computing device with which embodiments of the present invention may be practiced.

FIG. 14 is a block diagram illustrating example physical components of a computing device 1400 with which embodiments may be practiced. In a basic configuration, computing device 1400 may include at least one processing unit 1402 and a system memory 1404. Depending on the configuration and type of computing device, system memory 1404 may comprise, but is not limited to, volatile (e.g. random access memory (RAM)), non-volatile (e.g. read-only memory (ROM)), flash memory, or any combination. System memory 1404 may include operating system 1405, one or more programming modules 1406, and may include the web application service module 1420 for creating web applications using cloud-based friction-free databases without web hosting knowledge. Operating system 1405, for example, may be suitable for controlling the operation of computing device 1400. Furthermore, embodiments may be practiced in conjunction with a graphics library, other operating systems, or any other application program and is not limited to any particular application or system. This basic configuration is illustrated in FIG. 14 by those components within a dashed line 1408.

Computing device 1400 may have additional features or functionality. For example, computing device 1400 may also include additional data storage devices (removable and/or non-removable) such as, for example, magnetic disks, optical disks, or tape. Such additional storage is illustrated in FIG. 14 by a removable storage 1409 and a non-removable storage 1410.

As stated above, a number of program modules and data files may be stored in system memory 1404, including operating system 1405. While executing on processing unit 1402, programming modules 1406, such as the web application service module 1420, may perform processes including, for example, one or more of the processes described above with reference to FIGS. 1-13. The aforementioned processes are an example, and processing unit 1402 may perform other processes. Other programming modules that may be used in accordance with embodiments may include electronic mail and contacts applications, word processing applications, spreadsheet applications, database applications, slide presentation applications, drawing or computer-aided application programs, etc.

Generally, consistent with embodiments, program modules may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Furthermore, embodiments may be practiced in an electrical circuit comprising discrete electronic elements, packaged or integrated electronic chips containing logic gates, a circuit utilizing a microprocessor, or on a single chip containing electronic elements or microprocessors. For example, embodiments may be practiced via a system-on-a-chip (SOC) where each or many of the components illustrated in FIG. 14 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the web application service module 1420 may be operated via application-specific logic integrated with other components of the computing device/system 1400 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

Embodiments, for example, may be implemented as a computer process (method), a computing system, or as an article of manufacture, such as a computer program product or computer-readable storage medium. The computer program product may be a computer-readable storage medium readable by a computer system and encoding a computer program of instructions for executing a computer process.

The term computer-readable storage medium as used herein may include any computer-readable storage media, such as volatile and nonvolatile, removable and non-removable media implemented in any method or technology for storage of information. System memory 1404, removable storage 1409, and non-removable storage 1410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1400. Any such computer storage media may be part of device 1400. Computing device 1400 may also have input device(s) 1412 such as a keyboard, a mouse, a pen, a sound input device, a touch input device, etc. Output device(s) 1414 such as a display, speakers, a printer, etc. may also be included. The aforementioned devices are examples and others may be used.

The computer program product may also be embodied as communication media, which may include computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 15A:
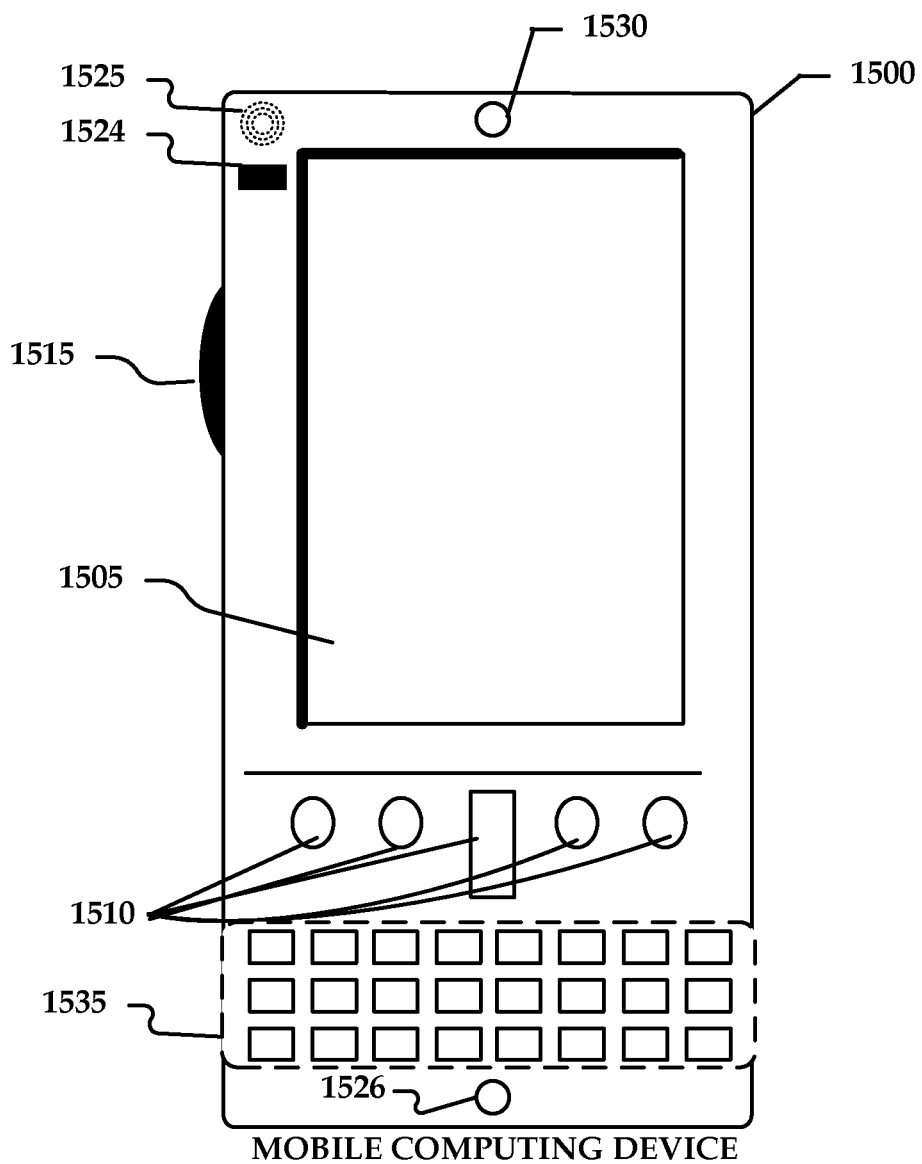
FIGS. 15a-b are simplified block diagrams of a mobile computing device with which embodiments of the present invention may be practiced.
Figure 15B:
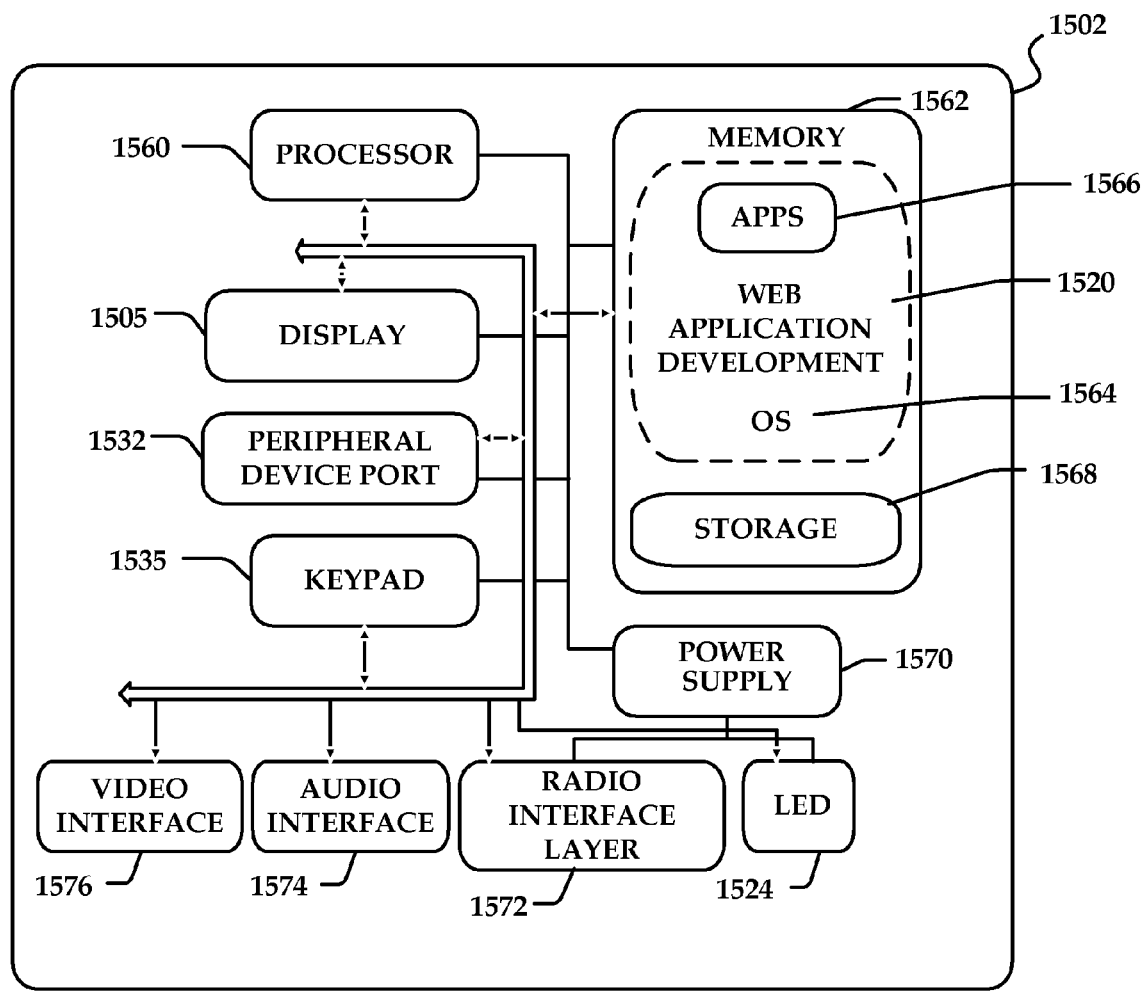

FIGS. 15a-b illustrate a suitable mobile computing environment, for example, a mobile telephone 1500, a smart phone, a tablet personal computer, a laptop computer, and the like, with which embodiments may be practiced. With reference to FIG. 15a, an example mobile computing device 1500 for implementing the embodiments is illustrated. In a basic configuration, mobile computing device 1500 is a handheld computer having both input elements and output elements. Input elements may include touch screen display 1505 and input buttons 1515 that allow the user to enter information into mobile computing device 1500. Mobile computing device 1500 may also incorporate an optional side input element 1515 allowing further user input. Optional side input element 1515 may be a rotary switch, a button, or any other type of manual input element. In alternative embodiments, mobile computing device 1500 may incorporate more or less input elements. For example, display 1505 may not be a touch screen in some embodiments. In yet another alternative embodiment, the mobile computing device is a portable phone system, such as a cellular phone having display 1505 and input buttons 1515. Mobile computing device 1500 may also include an optional keypad 1535. Optional keypad 1515 may be a physical keypad or a "soft" keypad generated on the touch screen display.

Mobile computing device 1500 incorporates output elements, such as display 1505, which can display a graphical user interface (GUI). Other output elements include speaker 1525 and LED light 1524. Additionally, mobile computing device 1500 may incorporate a vibration module (not shown), which causes mobile computing device 1500 to vibrate to notify the user of an event. In yet another embodiment, mobile computing device 1500 may incorporate a headphone jack (not shown) for providing another means of providing output signals.

Although described herein in combination with mobile computing device 1500, alternative embodiments may be used in combination with any number of computer systems, such as in desktop environments, laptop or notebook computer systems, multiprocessor systems, micro-processor based or programmable consumer electronics, network PCs, mini computers, main frame computers and the like. Embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments.

FIG. 15b is a block diagram illustrating components of a mobile computing device used in one embodiment, such as the computing device shown in FIG. 15a. That is, mobile computing device 1500 can incorporate system 1502 to implement some embodiments. For example, system 1502 can be used in implementing a "smart phone" that can run one or more applications similar to those of a desktop or notebook computer such as, for example, browser, e-mail, scheduling, instant messaging, and media player applications. In some embodiments, system 1502 is integrated as a computing device, such as an integrated personal digital assistant (PDA) and wireless phone.

One or more application programs 1566 may be loaded into memory 1562 and run on or in association with operating system 1564. Examples of application programs include phone dialer programs, e-mail programs, PIM (personal information management) programs, word processing programs, spreadsheet programs, Internet browser programs, messaging programs, and so forth. System 1502 also includes non-volatile storage 1568 within memory 1562. Non-volatile storage 1568 may be used to store persistent information that should not be lost if system 1502 is powered down. Applications 1566 may use and store information in non-volatile storage 1568, such as e-mail or other messages used by an e-mail application, and the like. A synchronization application (not shown) may also reside on system 1502 and may be programmed to interact with a corresponding synchronization application resident on a host computer to keep the information stored in non-volatile storage 1568 synchronized with corresponding information stored at the host computer. As should be appreciated, other applications may be loaded into memory 1562 and run on the device 1500, including the web application service 1520, described herein.

System 1502 has a power supply 1570, which may be implemented as one or more batteries. Power supply 1570 might further include an external power source, such as an AC adapter or a powered docking cradle that supplements or recharges the batteries.

System 1502 may also include a radio 1572 that performs the function of transmitting and receiving radio frequency communications. Radio 1572 facilitates wireless connectivity between system 1502 and the "outside world", via a communications carrier or service provider. Transmissions to and from radio 1572 are conducted under control of OS 1564. In other words, communications received by radio 1572 may be disseminated to application programs 1566 via OS 1564, and vice versa.

Radio 1572 allows system 1502 to communicate with other computing devices, such as over a network. Radio 1572 is one example of communication media. Communication media may typically be embodied by computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

This embodiment of system 1502 is shown with two types of notification output devices; LED 1524 that can be used to provide visual notifications and an audio interface 1574 that can be used with speaker 1525 to provide audio notifications. These devices may be directly coupled to power supply 1570 so that when activated, they remain on for a duration dictated by the notification mechanism even though processor 1560 and other components might shut down for conserving battery power. LED 1524 may be programmed to remain on indefinitely until the user takes action to indicate the powered-on status of the device. Audio interface 1574 is used to provide audible signals to and receive audible signals from the user. For example, in addition to being coupled to speaker 1525, audio interface 1574 may also be coupled to a microphone to receive audible input, such as to facilitate a telephone conversation. In accordance with embodiments, the microphone 1524 may also serve as an audio sensor to facilitate control of notifications, as will be described below. System 1502 may further include video interface 1576 that enables an operation of on-board camera 1530 to record still images, video stream, and the like.

A mobile computing device implementing system 1502 may have additional features or functionality. For example, the device may also include additional data storage devices (removable and/or non-removable) such as, magnetic disks, optical disks, or tape. Such additional storage is illustrated in FIG. 15b by storage 1568. Computer-readable storage media may include volatile and nonvolatile, removable and non-removable media implemented in any method or technology for storage of information.

Data/information generated or captured by the device 1500 and stored via the system 1502 may be stored locally on the device 1500, as described above, or the data may be stored on any number of storage media that may be accessed by the device via the radio 1572 or via a wired connection between the device 1500 and a separate computing device associated with the device 1500, for example, a server computer in a distributed computing network, such as the Internet. As should be appreciated such data/information may be accessed via the device 1500 via the radio 1572 or via a distributed computing network. Similarly, such data/information may be readily transferred between computing devices for storage and use according to well-known data/information transfer and storage means, including electronic mail and collaborative data/information sharing systems.

Figure 16:
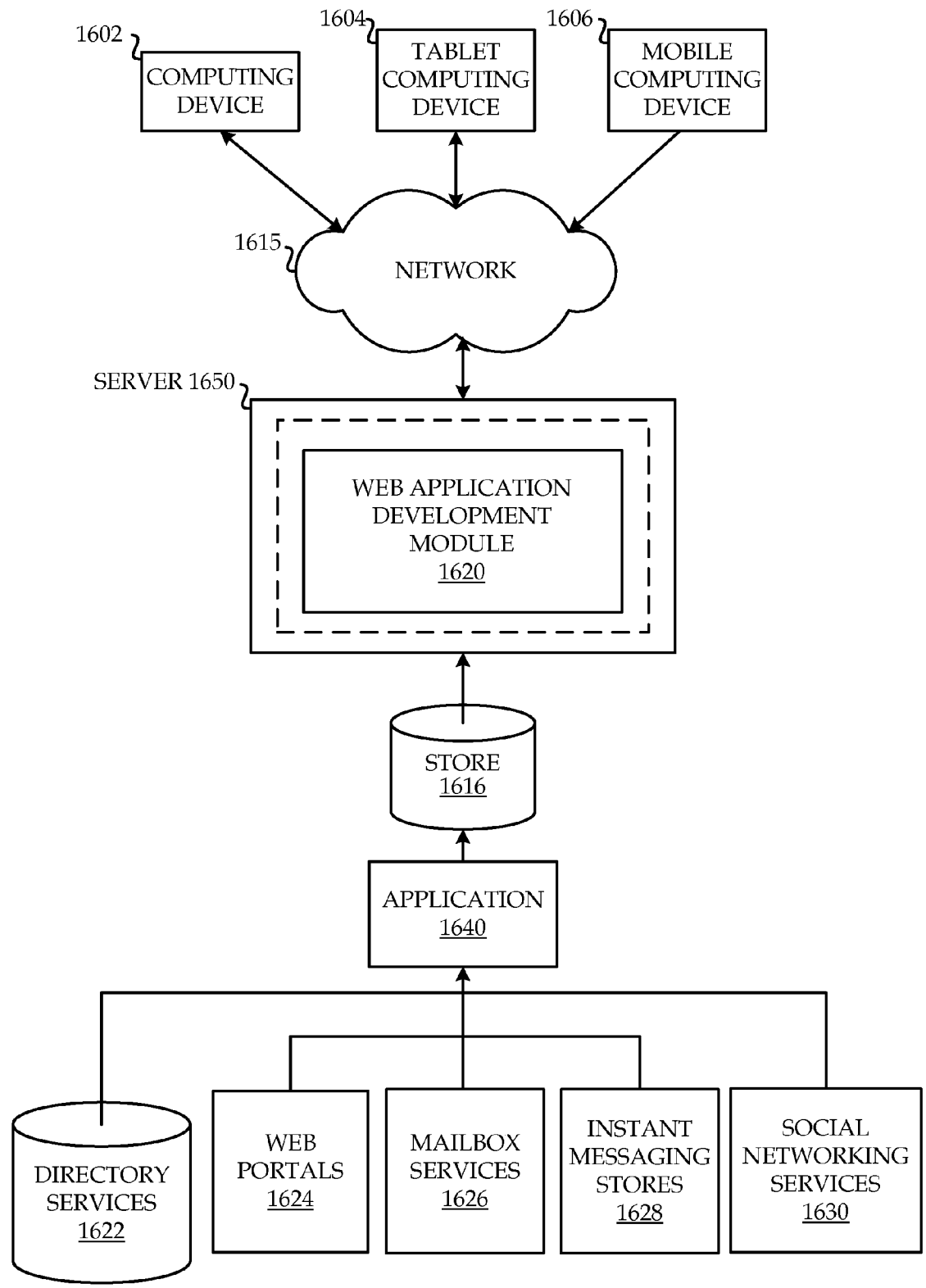
FIG. 16 is a simplified block diagram of a distributed computing system in which embodiments of the present invention may be practiced.

FIG. 16 illustrates a system architecture for creating web applications using cloud-based friction-free databases without web hosting knowledge, as described above. Web based applications developed, interacted with or edited in association with the web application service module 1620 may be stored in different communication channels or other storage types. For example, various LCI and LCA items along with information from which they are developed may be stored using directory services 1622, web portals 1624, mailbox services 1626, instant messaging stores 1628 and social networking sites 1630 and accessed by application 1640. The web application service module 1620 may use any of these types of systems or the like for enabling data utilization, as described herein. A server 1650 may provide access to the database for the web application to clients. As one example, server 1650 may be a web server providing access to the database for the web application to clients over the web. Server 1650 may provide access to the database for the web application to clients over the web through a network 1615. Examples of clients that may obtain access to the database for the web application include computing device 1602, which may include any general purpose personal computer, a tablet computing device 1604 and/or mobile computing device 1606, such as smart phones. Any of these devices may obtain content from the store 1616.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-13. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data can also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the embodiments has been presented for the purposes of illustration and description. It is not intended to be exhaustive or to limit the embodiments to the precise form disclosed. Many modifications and variations are possible in light of the above teaching. It is intended that the scope of the embodiments be limited not with this detailed description, but rather by the claims appended hereto.

What is claimed is:

1. A method for creating a web application using cloud-based friction-free databases, comprising:
    receiving user credentials at a web application service for initiating a web application task via client software, wherein the receiving user credentials at the web application service for initiating a web application task via client software further comprises providing a surface for a software package for initiating the web application task and providing a host in a hosted computing server and a host in a hosted database server platform, wherein the hosted database server platform provides a platform for file storage and a database to store user data, and wherein the web application service provides web front end (WFE) servers and automated deployment services (ADS) servers;
    analyzing the user credentials to determine whether to grant permission to initiate the web application task;
    initiating the web application task when permission is granted; and
    receiving data associated with the initiated web application task at the web application service for analysis of the data to host and render a web application based solely on received data provided without basis of web hosting knowledge.

2. The method of claim 1, wherein the initiating a web application task comprises building a web application.

3. The method of claim 2, wherein the building a web application comprises creation of user interfaces and database schema.

4. The method of claim 2 further comprising receiving a URL and an application database associated with the web application.

5. The method of claim 2, wherein the building the web application comprises managing the system database to map users, credentials and application databases.

6. The method of claim 2, wherein the building the web application further comprises creating one database per application in a hosted database server and one database specific login and three database roles/users for each application database.

7. The method of claim 1, wherein the providing the user credentials comprises providing a name for the application and a user ID.

8. The method of claim 1, wherein the initiating a web application task comprises mapping a user credential to users associated with an application database to determine whether the user has rights to read, write or design web applications.

9. The method of claim 1 further comprising returning an URL providing direction to a web application hosted on the Internet using data consisting only of web application data provided without basis of web hosting knowledge.

10. The method of claim 1, wherein the initiating the web application task comprises granting permission to a second user for access to the web application of the user.

11. The method of claim 1, wherein the initiating the web application task comprises allowing modification to the web application.

12. A system for creating a web application using cloud-based friction-free databases, comprising:
    a client device for providing user credentials for initiating a web application task;
    a middle tier for mapping a web application associated with the web application task, identifying a login for the mapped web application and determining a role based on the provided user credentials, wherein the web application task comprises a web application including user interfaces and database schema and wherein the web application service provides web front end (WFE) servers and automated deployment services (ADS) servers;
    a hosted database server for maintaining a system database and an application database, the system database being used to map users, credentials and application databases, wherein the hosted database server provides a platform for file storage and a database to store user data; and
    wherein the user credentials are analyzed to determine whether to grant the permission to initiate the requested web application task, the web application task being initiated when permission is granted and receiving data associated with the initiated web application task at the middle tier for analysis of the data to host and render a web application based solely on received data provided without basis of web hosting knowledge.

13. The system of claim 12, wherein the middle tier returns a URL and an application database associated with the web application, the URL providing direction to a web application hosted on the Internet using data consisting only of web application data provided without basis of web hosting knowledge.

14. The system of claim 12, wherein the web application further includes one database per application in maintained in the hosted database server and one database specific login and three database roles/users for each application database.

15. The system of claim 12, wherein the middle tier maps the user credential to users associated with an application database to determine whether the user has rights to read, write or design web applications.

16. The system of claim 12, wherein the web application task comprises granting permission to a second user for access to the web application of the user.

17. The system of claim 12, wherein the web application task comprises modifying a web application of the user.

18. A memory device with instructions stored thereon for creating a web application using cloud-based friction-free databases, the instructions comprising:
    receiving user credentials at a web application service for initiating a web application task via client software, wherein the receiving user credentials at the web application service for initiating a web application task via client software further comprises providing a surface for a software package for initiating the web application task and providing a host in a hosted computing server and a host in a hosted database server platform, wherein the hosted database server platform provides a platform for file storage and a database to store user data, and wherein the web application service provides web front end (WFE) servers and automated deployment services (ADS) servers;

analyzing the user credentials to determine whether to grant permission to initiate the web application task;

initiating the web application task when the user is granted permission; and receiving data associated with the initiated web application task at the web application service for analysis of the data to host and render a web application based solely on received data provided without basis of web hosting knowledge.

* * * * *